(12) United States Patent
Batchelor

(10) Patent No.: US 11,036,982 B2
(45) Date of Patent: Jun. 15, 2021

(54) CLOUD DETECTION IN AERIAL IMAGERY

(71) Applicant: Rosemount Aerospace Limited, Malvern (GB)

(72) Inventor: Scott Batchelor, Malvern (GB)

(73) Assignee: ROSEMOUNT AEROSPACE LIMITED, Malvern (GB)

(*) Notice: Subject to any disclaimer, the term of this patent is extended or adjusted under 35 U.S.C. 154(b) by 65 days.

(21) Appl. No.: 16/270,620

(22) Filed: Feb. 8, 2019

(65) Prior Publication Data

US 2019/0286875 A1 Sep. 19, 2019

(30) Foreign Application Priority Data

Mar. 19, 2018 (EP) .................................... 18162626

(51) Int. Cl.
| | |
|---|---|
| *G06K 9/00* | (2006.01) |
| *G06T 7/33* | (2017.01) |
| *G06T 7/70* | (2017.01) |
| *G06K 9/62* | (2006.01) |
| *G06T 3/00* | (2006.01) |

(Continued)

(52) U.S. Cl.
CPC ......... *G06K 9/0063* (2013.01); *G06K 9/6202* (2013.01); *G06K 9/6242* (2013.01); *G06T 3/0093* (2013.01); *G06T 3/40* (2013.01); *G06T 5/005* (2013.01); *G06T 5/50* (2013.01); *G06T 7/337* (2017.01); *G06T 7/70* (2017.01); *G06K 2209/27* (2013.01);

(Continued)

(58) Field of Classification Search
CPC .. G06K 9/0063; G06K 9/6202; G06K 9/6242; G06T 7/337; G06T 7/70; G06T 3/0093; G06T 3/40; G06T 5/005; G06T 5/50
See application file for complete search history.

(56) References Cited

U.S. PATENT DOCUMENTS

| | | |
|---|---|---|
| 9,063,544 B2 | 6/2015 | Vian et al. |
| 9,684,673 B2 | 6/2017 | Beckett et al. |

(Continued)

FOREIGN PATENT DOCUMENTS

JP    2016042321 A    3/2016

OTHER PUBLICATIONS

Extended European Search Report for International Application No. 18162626.8 dated Aug. 29, 2018, 8 pages.

(Continued)

*Primary Examiner* — Qun Shen
(74) *Attorney, Agent, or Firm* — Cantor Colburn LLP

(57) ABSTRACT

A method of detecting clouds in an acquired aerial image includes determining a region of a reference aerial image corresponding to a region of an acquired aerial image. For each of a plurality of locations over the region of the acquired aerial image and corresponding to a plurality of locations over the region of the reference aerial image, the mutual information of one or more variables associated with the location in the acquired aerial image and one or more variables associated with the corresponding location in the reference aerial image is calculated. Using the mutual information calculated for each of the plurality of locations over the region of the acquired aerial image, it is determined when the acquired aerial image displays a cloud at the location in the region of the acquired aerial image.

14 Claims, 3 Drawing Sheets

(51) Int. Cl.
*G06T 3/40* (2006.01)
*G06T 5/00* (2006.01)
*G06T 5/50* (2006.01)

(52) U.S. Cl.
CPC .............. *G06T 2207/10024* (2013.01); *G06T 2207/10032* (2013.01); *G06T 2207/30192* (2013.01)

(56) References Cited

U.S. PATENT DOCUMENTS

| | | | | |
|---|---|---|---|---|
| 10,182,225 | B1* | 1/2019 | Cui | G06K 9/00637 |
| 2014/0163772 | A1* | 6/2014 | Vian | G01S 17/89 |
| | | | | 701/2 |
| 2015/0324989 | A1* | 11/2015 | Smith | G06T 7/33 |
| | | | | 382/278 |
| 2015/0371431 | A1* | 12/2015 | Korb | G06K 9/00208 |
| | | | | 382/113 |
| 2017/0067739 | A1* | 3/2017 | Siercks | H04N 5/2257 |
| 2017/0084037 | A1* | 3/2017 | Barajas Hernandez | G06K 9/00637 |
| 2017/0206648 | A1* | 7/2017 | Marra | G01C 21/20 |
| 2018/0191967 | A1* | 7/2018 | Kester | G01J 3/0229 |

OTHER PUBLICATIONS

Lingjia Gu et al.: "Automatic Cloud Detection and Removal Algorithm for MODIS Remote Sensing Imagery", Journal of Software, vol. 6, No. 7, Jul. 1, 2011, pp. 1289-1296.

Miecznik Grzegorz et al: "Mutual information registration of multi-spectral and multi-resolution images of DigitalGlobe's WorldView—3 imaging satellite", Proceedings of SPIE, SPIE, 1000 20th St., Bellingham WA 98225-6705 USA, vol. 10198, May 5, 2017, pp. 1019811-1-1019811-12.

Thompson David R et al.: "Rapid Spectral Cloud Screening Onboard Aircraft and Spacecraft", IEEE Transactions on Geoscience and Remote Sensing, IEEE Service Center, Piscataway, NJ, US, vol. 52, No. 11, Nov. 1, 2014, pp. 6779-6792.

* cited by examiner

CLOUD DETECTION IN AERIAL IMAGERY

FOREIGN PRIORITY

This application claims priority to European Patent Application No. 18162626.8 filed Mar. 19, 2018, the entire contents of which is incorporated herein by reference.

TECHNICAL FIELD

This disclosure relates to the detection of clouds in aerial imagery, in particular to the detection of clouds in aerial imagery by using mutual information.

BACKGROUND

There are many uses of aerial imagery, e.g. for surveying. However, depending on the weather conditions when aerial images are captured, the captured aerial images may contain clouds which obscure the details of the earth's surface being photographed. It will be appreciated that images containing a significant proportion of the image obscured by clouds are generally less useful for surveying purposes.

It therefore helps to be able to assess the proportion of cloud coverage in an aerial image. However, clouds are sometimes difficult to identify owing to their similar visual appearance with other objects that may be present in an aerial image, e.g. snow or the sea.

SUMMARY

According to this disclosure, there is provided a method of detecting clouds in an acquired aerial image, the method comprising: determining a region of a reference aerial image corresponding to a region of an acquired aerial image; calculating, for each of a plurality of locations over the region of the acquired aerial image and corresponding to a plurality of locations over the region of the reference aerial image, the mutual information of one or more variables associated with the location in the acquired aerial image and one or more variables associated with the corresponding location in the reference aerial image; and determining, using the mutual information calculated for each of the plurality of locations over the region of the acquired aerial image, when the acquired aerial image displays a cloud at the location in the region of the acquired aerial image.

Also according to this disclosure, there is provided a data processing system for detecting clouds in an acquired aerial image, the data processing system comprising: processing circuitry configured to: determine a region of a reference aerial image corresponding to a region of an acquired aerial image; calculate, for each of a plurality of locations over the region of the acquired aerial image and corresponding to a plurality of locations over the region of the reference aerial image, the mutual information of one or more variables associated with the location in the acquired aerial image and one or more variables associated with the location in the reference aerial image; and determine, using the mutual information calculated for each of the plurality of locations over the region of the acquired aerial image, when the acquired aerial image displays a cloud at the location in the region of the acquired aerial image.

The present disclosure provides a method of and a data processing system for detecting clouds in an acquired aerial image. The method and data processing system determine a region of a reference aerial image that corresponds to a region of the acquired aerial image. For multiple pairs of locations over these corresponding regions (i.e. for each location in the region of the acquired aerial image and the corresponding location in the region of the reference aerial image), the mutual information is calculated for one or more variables associated with the location in the acquired aerial image and one or more variables associated with the location in the reference aerial image.

The mutual information is a statistical method of matching (e.g. different band or modality) images in order to determine the similarities between the images. A higher value for the mutual information indicates a greater similarity between the images (and vice versa). Using this mutual information, the method and data processing system determine when the aerial image is displaying a cloud, for each location in the acquired aerial image.

Thus it will be appreciated that at least in some embodiments the mutual information provides an effective way of comparing a region of an acquired aerial image to the corresponding region of a reference aerial image to determine when cloud is displayed at the locations over the region of the acquired aerial image. In other words, the (e.g. cloud free) reference aerial image displays what features are known to be there (and thus are expected to be there in the acquired aerial image). When these features do not match with what is displayed in the acquired aerial image, i.e. assessed using the mutual information, this aids a determination of when a cloud is present in the acquired aerial image.

The acquired aerial image may be any suitable and desired aerial image that has been acquired and, e.g., is intended to be used to study an area of the earth's surface. In at least some examples, the acquired aerial image represents an area of land on the earth's surface. The acquired aerial image may comprise any suitable and desired type of image (e.g. a colour (e.g. RGB or YUV) image or taken at a non-visible part of the electromagnetic spectrum) that is representative of an area of the earth's surface; however, in some examples the acquired aerial image comprises a grayscale image. In at least some examples, the acquired aerial image comprises a (substantially) nadir image.

The acquired aerial image may be acquired in any suitable and desired way, e.g. taken from a satellite. In at least some examples, the acquired aerial image is captured from an airborne platform, e.g. an aircraft such as an aeroplane or drone. Thus, in some examples, the method comprises capturing an aerial image (or a plurality of aerial images) for use as an acquired aerial image (or plurality of acquired aerial images). Such acquired aerial image(s) can then be processed in the manner of the present disclosure to detect clouds in them.

Like the acquired aerial image, the reference aerial image may be any suitable and desired aerial image that has been acquired and, e.g., is intended to be used to study an area of the earth's surface. Thus, in at least some examples, the reference aerial image represents an area of land on the earth's surface. The reference aerial image may be retrieved from a library of multiple reference aerial images, e.g. that cover large areas of the earth's surface. Thus the reference aerial image may comprise a composite image (i.e. assembled from multiple different images).

The reference aerial image may comprise any suitable and desired type of image (e.g. a grayscale image) that is representative of an area of the earth's surface; however, in some examples the reference aerial image comprises a colour (e.g. RGB or YUV) image. Thus the acquired aerial image and reference aerial image may comprise different types of images and may represent an area of the earth's surface in different ways. In at least some examples, the reference aerial image comprises a (substantially) nadir image. Using both acquired and reference aerial images that are (substantially) nadir images (or otherwise from substantially the same perspective) helps to maximise the similarity between the acquired and reference aerial images making them easier to compare when calculating the mutual information.

The reference aerial image may be acquired in any suitable and desired way, e.g. taken from an airborne platform. In some examples the reference aerial image is captured from a satellite. Thus, in some examples, the method comprises capturing an aerial image (or a plurality of aerial images) for use as a reference aerial image (or plurality of reference aerial images). Such reference aerial image(s) may then be used in the manner of the present disclosure to detect clouds in the acquired aerial image(s).

In some examples, the reference aerial image does not contain clouds, e.g. all of the area of the earth's surface over the reference aerial image is visible in the reference aerial image. The method may therefore comprise (e.g. manually) checking the reference aerial image for the presence of clouds (and, e.g., discarding the reference aerial image when it contains one or more clouds). However, in at least some examples the reference aerial image is retrieved from a library of reference aerial images, e.g. Google Maps, which may contain only images that are substantially free from clouds.

The region of the acquired aerial image and/or the corresponding region of the reference aerial image may comprise any suitable and desired resolution. In some examples, the region of the acquired aerial image and/or the corresponding region of the reference aerial image comprise a resolution of at least 100 megapixels.

The region of the acquired aerial image and/or the corresponding region of the reference aerial image may represent any suitable and desired area of the earth's surface. In some examples, the region of the acquired aerial image and/or the corresponding region of the reference aerial image represent an area of the earth's surface of at least 100 $m^2$, e.g. at least 1,000 $m^2$, e.g. at least 10,000 $m^2$, e.g. at least 100,000 $m^2$, e.g. at least 1,000,000 $m^2$.

The clouds to be detected may be any suitable and desired clouds. Of particular interest to the present disclosure are clouds that substantially obscure the features of the earth's surface (e.g. the features that are visible in the region of the reference aerial image) below the respective clouds, such that these features cannot be seen fully in the corresponding region of the acquired aerial image owing to the presence of the clouds.

The method comprises (and the processing circuitry is configured to) determining the region of a reference aerial image that corresponds to a region of an acquired aerial image (and which corresponds to an area of the earth's surface). The region of the acquired aerial image and the corresponding region of the reference aerial image may comprise any suitable and desired region. The region of the acquired aerial image may comprise only part (i.e. not all) of the acquired aerial image; however, in some examples the region of the acquired aerial image comprises the whole of the acquired aerial image (e.g. the region of the acquired aerial image comprises a frame or tile of acquired aerial image data).

The region of the reference aerial image (which may comprise a composite image) may be selected (e.g. from a reference library) to correspond to the region of the acquired aerial image. In some examples, the region of the reference aerial image corresponds to the same areal extent as the region of the acquired aerial image. In some examples, the region of the reference aerial image is selected using the geographical coordinates (e.g. latitude and longitude) of the acquired aerial image to select the corresponding region of the reference aerial image. Thus, in some examples, only the region of the reference aerial image corresponding to the region of the acquired aerial image is retrieved (e.g. from a library of reference images) for comparison with the acquired aerial image.

In at least some examples, the (e.g. region of the) acquired aerial image comprises a set of geographical coordinates (e.g. latitude and longitude), e.g. in meta-data associated with the acquired aerial image. In at least some examples, the (e.g. region of the) reference aerial image comprises a set of geographical coordinates (e.g. latitude and longitude), e.g. in meta-data associated with the reference aerial image. In some examples, the meta-data is stored as, e.g., latitude and longitude with respect to a datum (e.g. WGS84). The meta-data may, for example, be associated with each pixel of the acquired aerial image and the reference aerial image or with the corners of the (e.g. region of the) acquired aerial image and the reference aerial image.

In at least some examples, the method (e.g. prior to the step of determining the region of the reference aerial image corresponding to the region of the acquired aerial image) comprises aligning the region of the acquired aerial image to the region of the reference aerial image. Aligning the (e.g. regions) of the acquired and reference aerial images helps to be able to compare the acquired and reference aerial images (e.g. when calculating the mutual information) because it is then easier to map the plurality of locations over the region of the acquired aerial image to the corresponding plurality of locations over the region of the reference aerial image. In some examples, the region of the acquired aerial image is aligned to the region of the reference aerial image using meta-data (e.g. geographical coordinates) associated with the acquired aerial image and meta-data (e.g. geographical coordinates) associated with the reference aerial image.

The (e.g. region of the) acquired aerial image and the (e.g. region of the) reference aerial image may have been captured from different perspectives. In some examples, the reference aerial image is retrieved in a format that has already been warped (if necessary), e.g. to a nadir perspective, but if not, the method may comprise warping the region of the reference aerial image (e.g. to a nadir perspective). Thus, in at least some examples, the method (e.g. the step of aligning the region of the acquired aerial image to the corresponding region of the reference aerial image) comprises warping the (e.g. perspective of the) region of the acquired aerial image to the (e.g. perspective of the) region of the reference aerial image, e.g. such that the region of the acquired aerial image has the same perspective as the reference aerial image.

While aerial images can be warped into another perspective, the imaged scene often does not lie in a plane. This may cause undesirable distortion to occur if such images are warped. For example, an oblique image can be warped to a nadir perspective but will still show the sides of buildings not the tops as would be seen were the image to have been captured from a nadir perspective. Thus it may be better to minimise the amount of warping performed (and use substantially nadir images, as outlined above).

In some examples, the step of warping comprises orthorectifying the region of the acquired aerial image. In some examples, the reference aerial image is retrieved in a format that has already been orthorectified (if necessary), but if not, the method may comprise orthorectifying the region of the reference aerial image. In some examples the reference aerial image is, e.g. orthorectified, stored and retrieved in the Web Mercator projection. In at least some examples, the region of the acquired aerial image is warped (e.g. orthorectified) to the region of the reference aerial image using meta-data (e.g. geographical coordinates) associated with the acquired aerial image and meta-data (e.g. geographical coordinates) associated with the reference aerial image, e.g. such that the region of the acquired aerial image has the same projection as the reference aerial image (which is, e.g., the Web Mercator projection).

The (e.g. region of the) acquired aerial image and the (e.g. region of the) reference aerial image may have been captured (or stored) at different resolutions. Thus, in at least some examples, the method (e.g. the step of determining the region of the reference aerial image corresponding to the region of the acquired aerial image) comprises scaling the region of the acquired aerial image to the (e.g. same resolution as the) region of the reference aerial image (e.g. when the (e.g. region of the) acquired aerial image and the (e.g. region of the) reference aerial image are of different resolutions). This also helps to map the plurality of locations over the region of the acquired aerial image to the corresponding plurality of locations over the region of the reference aerial image. The region of the acquired aerial image may be upscaled or downscaled as appropriate.

Once the corresponding regions of the acquired and reference aerial images have been determined (and, e.g., aligned, warped, orthorectified and/or scaled, as appropriate, e.g. as a prior step), the mutual information of one or more variables associated with the region of the acquired aerial image and one or more variables associated with the region of the reference aerial image, for each of a plurality of corresponding locations over the regions of the acquired and reference aerial images, is calculated. The mutual information may be calculated using any suitable and desired variable(s) associated with the region of the acquired aerial image and any suitable and desired variable(s) associated with the region of the reference aerial image.

In some examples, the mutual information is calculated using one or more image data variables associated with (each location in) the region of the acquired aerial image and one or more image data variables associated with (each location in) the region of the reference aerial image. The one or more variables associated with the region of the acquired aerial image and the one or more variables associated with the region of the reference aerial image may not necessarily be the same one or more variables for both the acquire and reference aerial images but in some examples they are the image data (e.g. RGB or YUV image data, or luminance image data for grayscale images). For example, when a grayscale acquired aerial image is being compared with a colour reference aerial image, the luminance data from the acquired aerial image may be compared with one channel (e.g. the red band) of the colour image data from the reference aerial image, when calculating the mutual information. In another example, when a grayscale acquired aerial image is being compared with a colour reference aerial image, the luminance data from the acquired aerial image may be compared with the luminance data (of the colour image data) from the reference aerial image, when calculating the mutual information.

The mutual information is calculated at a plurality of locations over the region of the acquired aerial image and the corresponding plurality of locations over the region of the reference aerial image. In at least some examples, the plurality of locations correspond to pixels in the acquired and reference aerial images. In some examples, the mutual information is calculated at each of the pixels over the region of the acquired aerial image and the corresponding pixels over the region of the reference aerial image. The mutual information may be calculated using the values of the one or more variables at the plurality of locations by sampling each of the one or more variables at each of the plurality of locations and using these sampled values of the one or more variables.

In at least some examples, for each of the plurality of locations over the region of the acquired aerial image and the corresponding plurality of locations over the region of the reference aerial image, the mutual information is calculated using the one or more variables over a patch encompassing the location in the acquired aerial image and the one or more variables over a patch encompassing the corresponding location in the reference aerial image. Thus, in at least some examples, each patch comprises a plurality of pixels and the mutual information at each location (i.e. over each patch) is calculated using the one or more variables associated with each of the plurality of pixels in the patch (for the corresponding patches in the acquired and reference aerial images). Using patches of the acquired and reference images (e.g. each patch containing a plurality of pixels each having associated with them the one or more variables) to calculate the mutual information helps to increase the amount of information that is used when calculating the mutual information at each location. This helps to provide an accurate comparison of the acquired and reference aerial images, and thus helps to detect clouds in the acquired aerial image.

The patches encompassing each of the plurality of locations over the region of the acquired aerial image and the corresponding plurality of locations over the region of the reference aerial image, may be any suitable and desired shape and/or size. For example, the patches may be circular or rectangular and, e.g., centred on each of the plurality of locations over the region of the acquired aerial image and the corresponding plurality of locations over the region of the reference aerial image. In some examples, each patch is (e.g. rectangular) between 50 pixels by 50 pixels and 1000 pixels by 1000 pixels, e.g. between 100 pixels by 100 pixels and 500 pixels by 500 pixels, e.g. between 200 pixels by 200 pixels and 400 pixels by 400 pixels. These sizes of patches may be suitable for assessing the presence of clouds while helping to ignore smaller changes between the acquired and reference aerial images (e.g. owing to changes in infrastructure such as buildings).

Larger patches may be better for determining when a region of an acquired image is displaying a cloud because differences over a larger area between the acquired and reference aerial images (which are reflected in the calculated mutual information) are more likely to be because of the presence of clouds in the acquired aerial image and less likely to be because of smaller scale (e.g. infrastructural) changes. For example, owing to the statistical nature of the mutual information calculated, each patch preferably contains a sufficient number of pixels to make a statistical approach valid (in the statistical sense). Also, each patch preferably contains image data having sufficient geographic coverage to filter out smaller changes visible in the acquired aerial image, e.g. owing to modifications to infrastructure. The geographic coverage depends on the coverage of a single pixel (the resolution), the number of pixels within a patch and also the shape of a patch.

It will be appreciated that the size of the patches that are used may depend, for example, on the resolution of the acquired and/or reference aerial images. Thus, for example, smaller patches (e.g. containing fewer pixels) may be used when the resolution of the acquired and/or reference aerial images is lower (or vice versa), or smaller, low resolution images may be discarded if they do not provide sufficient patches (or pixels within each patch) to be able to calculate the mutual information reliably enough (e.g. owing to the mutual information being a statistical method).

Once the mutual information has been calculated, the mutual information is used to determine when the acquired aerial image is displaying a cloud at each of the plurality of locations over the region of the acquired aerial image. In some examples, the step of determining when the acquired aerial image displays a cloud at the location in the region of the acquired aerial image (for each of the plurality of locations) comprises applying a threshold to the mutual information. In some examples, when a location has a mutual information below the threshold, it is determined to be displaying a cloud. In some examples, when a location has a mutual information above the threshold, it is determined not to be displaying a cloud.

Applying a threshold helps to discriminate between the locations in the acquired aerial image that appear the same (or at least substantially similar) as the corresponding locations in the reference aerial image and the locations in the acquired aerial image that appear differently from the corresponding locations in the reference aerial image. These latter locations may be interpreted as being those locations at which a cloud is present in the acquired aerial image.

The threshold may be tuned, e.g. for a particular acquired aerial image or set of images. When patches are used to calculate the mutual information, the threshold may depend on the size of the patches. For example, when larger patches are used, the threshold may be lower than when smaller patches are used. This is because differences between the acquired and reference aerial images assessed over a larger patch are more likely to be because of the presence of clouds in the acquired aerial image than because of other (e.g. infrastructural) changes.

The determination of when there is a cloud displayed at each of the plurality of locations in the region of the acquired aerial image may be used to determine the overall proportion of clouds in the region of the acquired aerial image, e.g. by counting up all the locations (e.g. pixels or patches) at which it has been determined that a cloud is displayed and, e.g., calculating the ratio of the number of locations which display a cloud to the total number of locations. Thus, in some examples, the method comprises (and the processing circuitry is configured to) determining, using the determination of when the acquired aerial image displays a cloud at the plurality of locations in the region of the acquired aerial image, the proportion of the region of the acquired aerial image at which cloud is displayed.

The proportion of the acquired aerial image covered in cloud may then be used as a variable with which to sort or select acquired aerial images, for example. Thus in some examples, the method comprises (and the processing circuitry is configured to) storing the proportion of the region of the acquired aerial image at which cloud is displayed in meta-data associated with the acquired aerial image (e.g. in a memory). Storing this parameter in the meta-data enhances the search capabilities of an image library in which the acquired aerial image is used (e.g. after the method of the present disclosure has been performed). It will be appreciated that, in general, acquired aerial images having a lower proportion of clouds in them are more useful, owing to the amount of information that is visible on the ground. Thus, acquired aerial images having greater than a certain proportion covered in cloud may be discarded and not, for example, kept for future reference and analysis.

When a location in the acquired aerial image is covered in cloud, the features on the ground from the corresponding reference aerial image may be blended through the cloud in the acquired aerial image, e.g. to provide context to the acquired aerial image for a user viewing the acquired aerial image. Thus, in some examples, the method comprises (and the processing circuitry is configured to), for each of the plurality of locations over the region of the acquired aerial image at which it has been determined that the acquired aerial image displays a cloud, superimposing at least some of the image data from the corresponding location in the reference aerial image onto the acquired aerial image at the location in the acquired aerial image (e.g. such that a composite image is formed). In some examples, the image data from the corresponding location in the reference aerial image is superimposed onto (e.g. blended into) the acquired aerial image such that the image data from both the reference and acquired aerial images is visible at the location in the acquired aerial image.

The image data from the corresponding location in the reference aerial image that is superimposed onto the acquired aerial image may be all of the image data that is visible at that particular location (e.g. for a patch encompassing a pixel) or may comprise the main features from image data at the corresponding location in the reference aerial image, e.g. the reference aerial image may be filtered (e.g. by a low pass filter) to promote larger features.

In some examples, e.g. instead of using image data from the reference aerial image, map imagery corresponding to the location (at which a cloud is displayed) in the acquired aerial image is superimposed onto (e.g. blended into) the location in the acquired aerial image. Again, this helps to provide contextual information and is possible because the reference aerial image and the map imagery are likely to already be aligned by the reference imagery provider (e.g. Google Maps®) and so may be able to be used interchangeably.

The memory referred to herein may be any desired and suitable memory of or for the data processing system. The memory may be, for example, main system memory. The memory may be external to the data processing system (e.g. a distributed memory).

In embodiments, the data processing system may comprise, and/or may be in communication with, one or more memories and/or memory devices that store the data described herein (e.g. the acquired aerial images, the reference aerial images and the associated meta-data), and/or store software for performing the processes described herein. The data processing system may comprise, and/or may be in communication with, a host microprocessor and/or a display for displaying the acquired aerial images and the reference aerial images.

The method may be performed in any suitable and desired way and on any suitable and desired platform. In some examples the method of detecting clouds in an acquired aerial image is a computer implemented method, e.g. the steps of the method are performed by processing circuitry.

The methods in accordance with the present disclosure may be implemented at least partially using software, e.g. computer programs. It will thus be seen that the present disclosure may also provide computer software specifically adapted to carry out the methods described herein when installed on a data processor, a computer program element comprising computer software code portions for performing the methods described herein when the program element is run on a data processor, and a computer program comprising code adapted to perform all the steps of a method or of the methods described herein when the program is run on a data processing system.

The present disclosure also extends to a computer software carrier comprising such software arranged to carry out the steps of the methods of the present disclosure. Such a computer software carrier could be a physical storage medium such as a ROM chip, CD ROM, DVD, RAM, flash memory or disk, or could be a signal such as an electronic signal over wires, an optical signal or a radio signal such as to a satellite or the like.

It will further be appreciated that not all steps of the methods of the present disclosure need be carried out by computer software and thus from a further broad example the present disclosure provides computer software and such software installed on a computer software carrier for carrying out at least one of the steps of the methods set out herein.

The present disclosure may accordingly suitably be embodied as a computer program product for use with a computer (e.g. data processing) system. Such an implementation may comprise a series of computer readable instructions either fixed on a tangible, non-transitory medium, such as a computer readable storage medium, for example, diskette, CD ROM, DVD, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic or optical, or transmitted using any communications technology, present or future, including but not limited to optical, infrared or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

BRIEF DESCRIPTION OF DRAWINGS

One or more non-limiting examples will now be described, by way of example only, and with reference to the accompanying figures in which.

DETAILED DESCRIPTION OF DRAWINGS

When analysing an acquired aerial image of an area of the earth's surface, it is helpful to be able to assess the cloud coverage in the image, such that this information may be used when performing further analysis of the acquired aerial image. An example of how this may be performed will now be described.

Figure 1A:
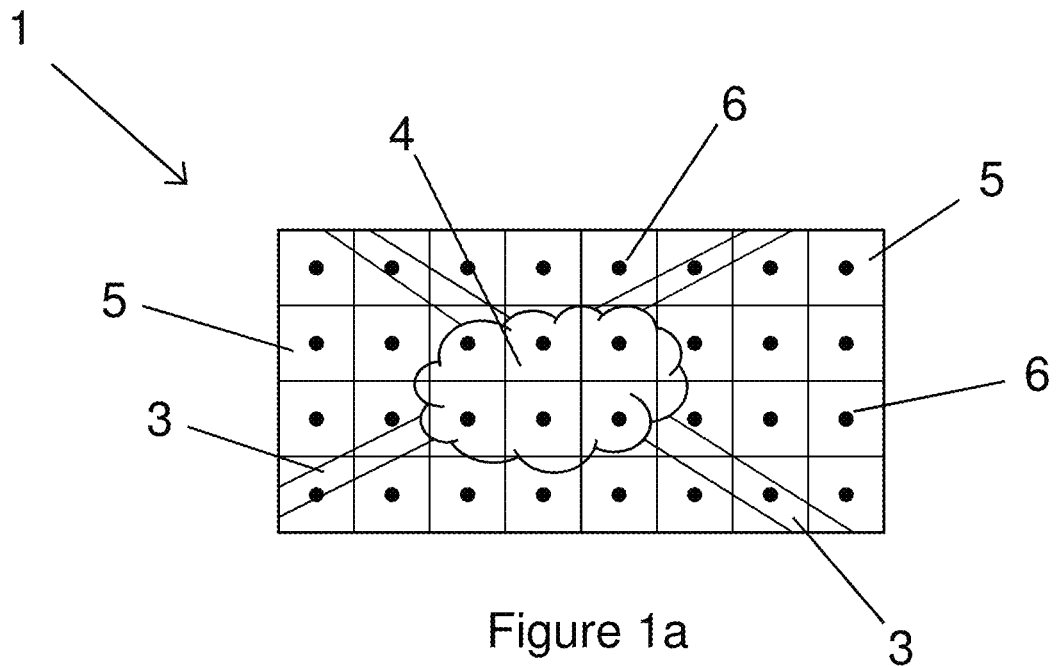
FIGS. 1a and 1b show corresponding acquired and reference images to be compared.
Figure 1B:
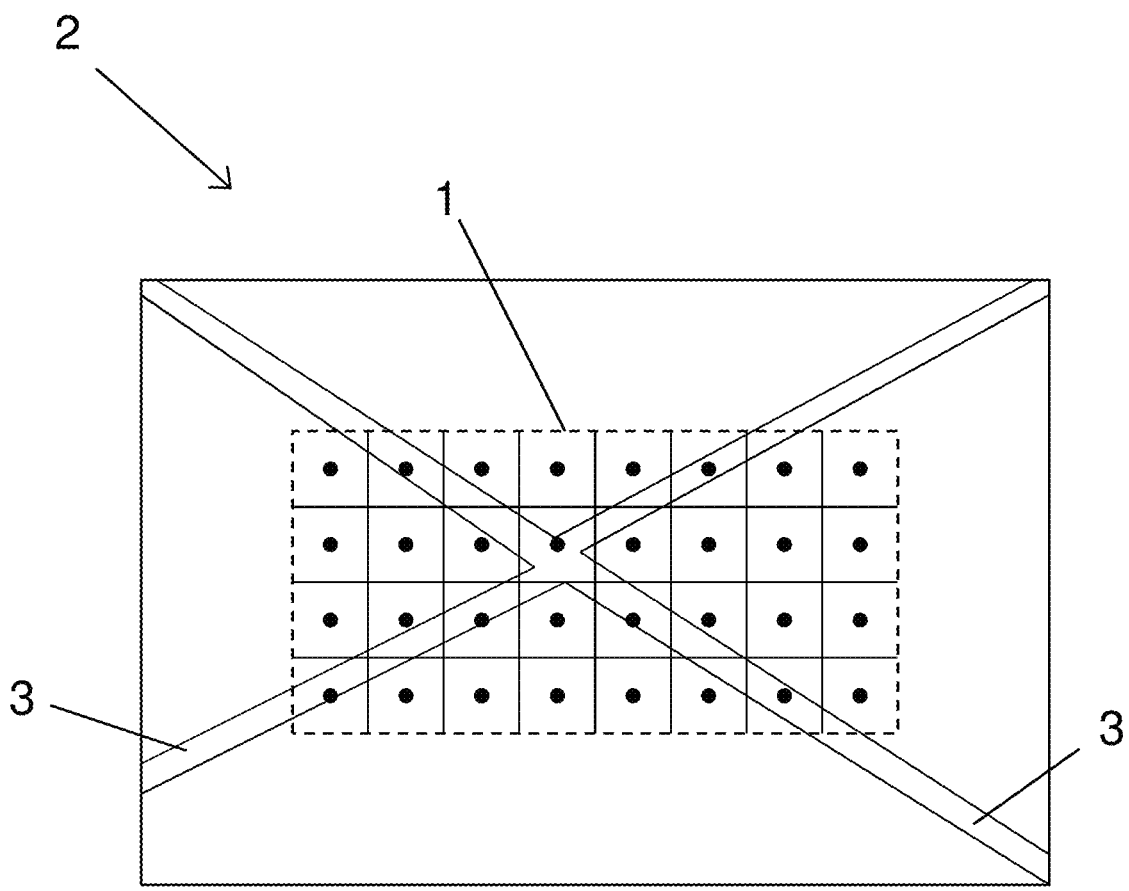

FIGS. 1a and 1b show an acquired aerial image 1 and a reference aerial image 2 respectively. The acquired aerial image 1 to be analysed is taken from an airborne platform (e.g. a drone) of an area of the earth's surface and, for example, comprises a grayscale image. The acquired aerial image 1 shows features such as roads 3 on the earth's surface and may also display clouds 4 that obscure the features (e.g. part of the roads 3) on the earth's surface.

For the purposes of analysing the acquired aerial image 1 to determine if the image 1 contains clouds 4, the image 1 is split up into square patches 5 centred on the pixels 6 of the acquired image 1. (For the purposes of clarity, not all of the pixels and patches in the acquired aerial image 1 are shown. It will be appreciated that if all the pixels in the acquired aerial image 1 are used, with patches of the size shown in FIG. 1a, these patches would overlap with at least the patches centred on the adjacent pixels, and in at least some examples such overlapping patches are used.)

The reference aerial image 2 to be compared to the acquired aerial image 1 is shown in FIG. 1b. The reference aerial image 2 (e.g. a colour image), showing the roads 3 on the earth's surface, is free from clouds. FIG. 1b also shows the acquired aerial image 1, divided into the square patches 5 centred on the pixels 6 of the acquired image 1, for the purposes of the comparison to be made. The resolution of the area of the reference aerial image 2 is the same as the resolution of the corresponding acquired aerial image 1 such that the pixels 6 in the acquired aerial image 1 correspond to pixels in the reference aerial image 2. Thus the region of the reference aerial image 2 that corresponds to the acquired aerial image 1 is also divided up into the same square patches.

The reference aerial image 2 is retrieved from a library of reference images (e.g. Google Maps). The retrieved reference aerial image 2 may cover the same geographic extent as the acquired aerial image 1 or, as shown in FIG. 1b, may cover a larger area, with a region of the reference aerial image 2 being used when comparing with the acquired aerial image 1.

Figure 2:
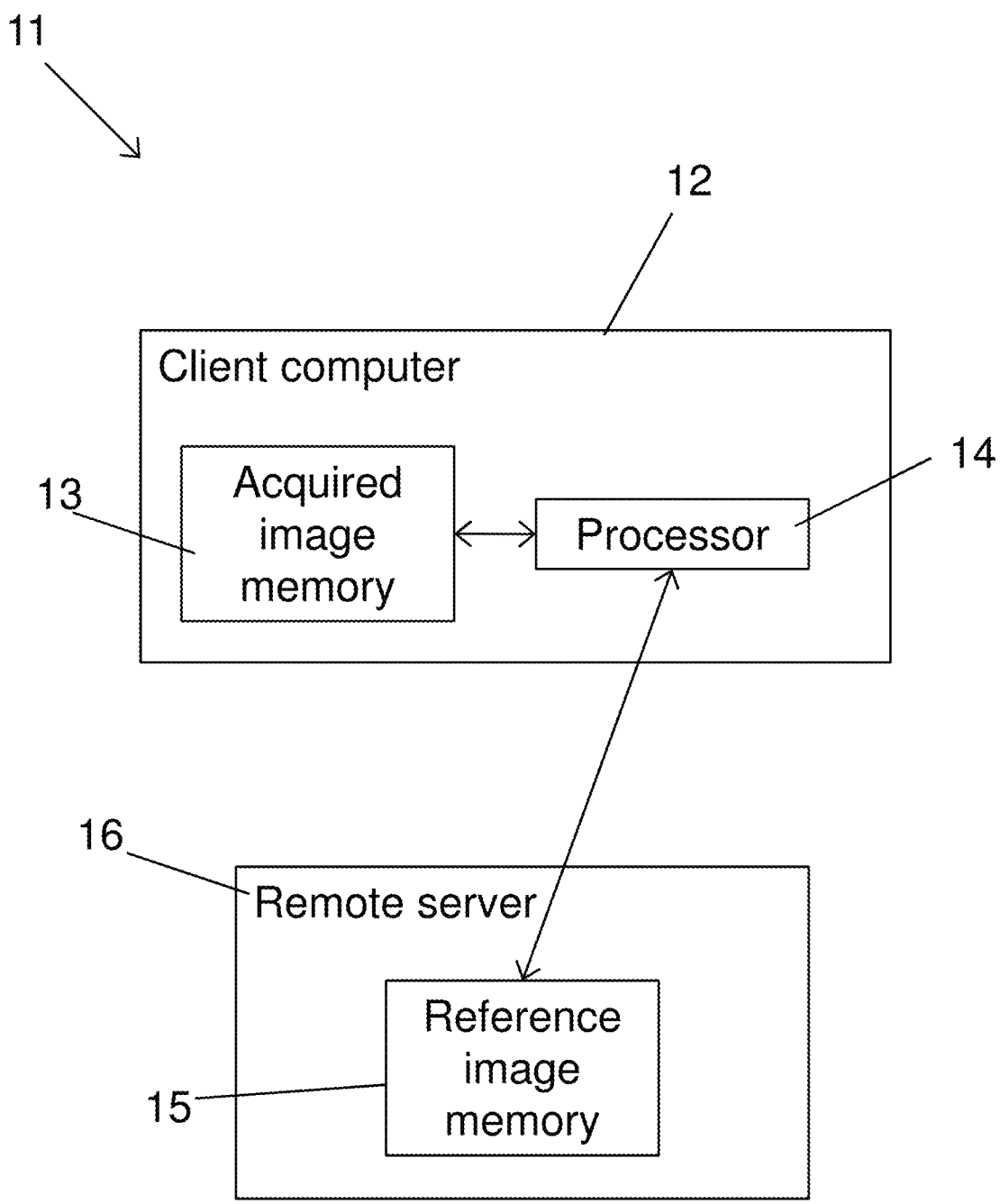
FIG. 2 shows a data processing system for analysing the acquired and reference images shown in FIGS. 1a and 1b.

FIG. 2 shows a data processing system 11 on which the acquired and reference images 1, 2 may be processed. The system 11 includes a client computer 12 that has a memory 13 in which the acquired aerial images are stored (this memory may be distributed over multiple computers connected to the client computer 12). The client computer 12 also includes a processor 14 that is arranged to analyse the acquired and reference aerial images 1, 2. The (e.g. processor 14 of the) client computer 12 may include a cache for storing regions of the acquired and reference aerial images 1, 2 locally while processing them.

The reference aerial images 2 are stored on and retrieved from a memory 15 on a remote server 16 (though, for example, could equally be stored on the client computer 12 or both the acquired and reference aerial images 1, 2 could be stored on the same computer). As with the memory 13 of the client computer 12, the memory 15 of the remote server 16 may be distributed across multiple connected remote servers.

Figure 3:
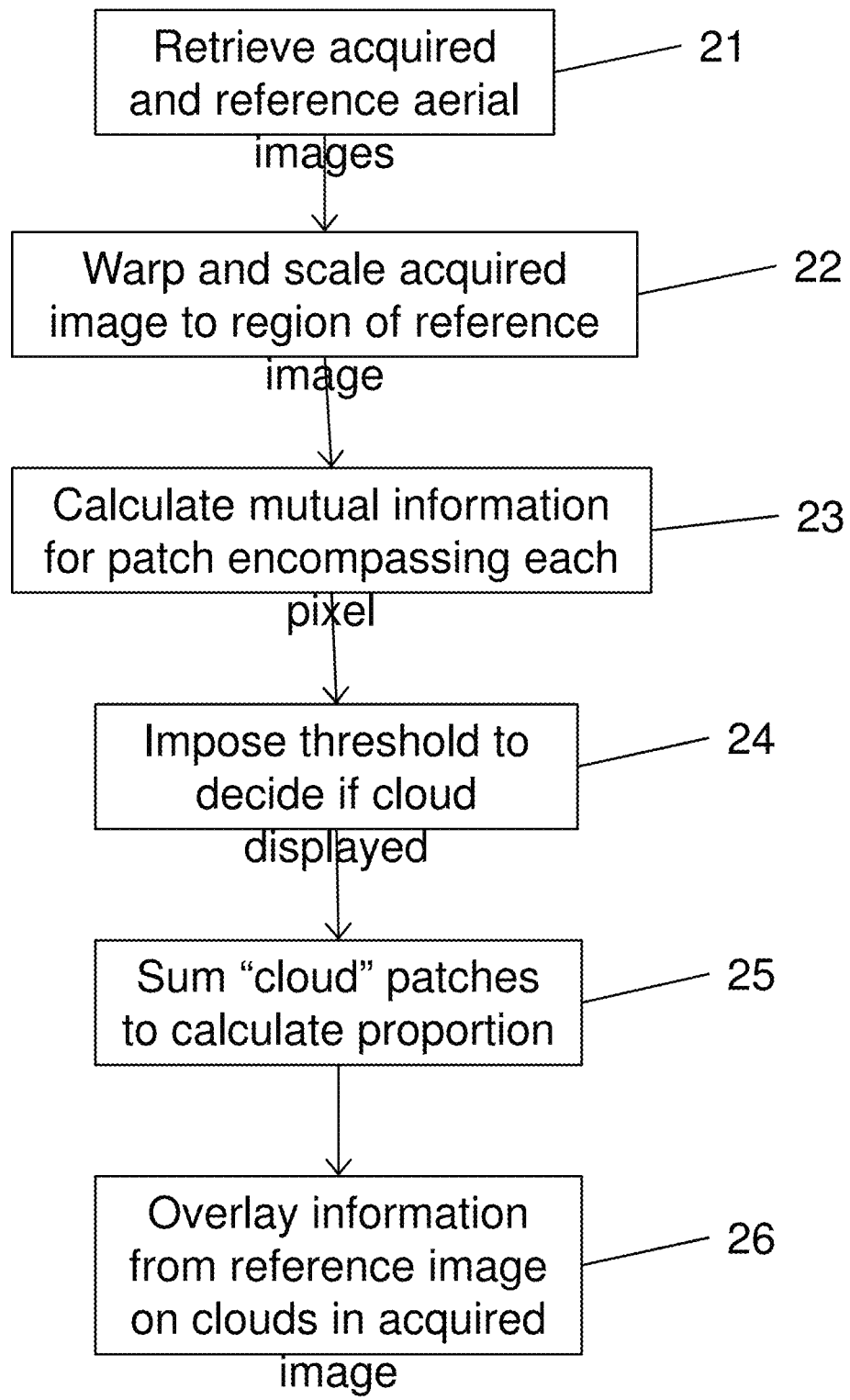
FIG. 3 shows a flow chart of the steps of analysing the acquired and reference images shown in FIGS. 1a and 1b using the data processing system shown in FIG. 2.

Operation of the example shown in FIGS. 1a, 1b and 2 will now be described with reference to FIG. 3. FIG. 3 shows a flow chart detailing the steps of processing the acquired and reference aerial images 1, 2 to detect clouds 4 in the acquired aerial image 1.

First, an acquired aerial image 1 to be processed is selected by the processor 14 of the client computer 12 from its memory 13. Using meta-data (e.g. geographical coordinates) associated with the acquired aerial image 1, the corresponding region from a reference aerial image 2 is requested by the processor 14 from the memory 15 of the remote server 16 (step 21, FIG. 3).

Before the acquired aerial image 1 may be compared directly with the region of the reference aerial image 2, the acquired aerial image 1 is orthorectified to warp it onto the same perspective as the reference aerial image 2 (which will generally be in the Web Mercator format), so that the acquired and reference aerial images 1, 2 are aligned with each other (however, any shared perspective and/or projection between the acquired and reference aerial images 1, 2 may be used). The acquired aerial image 1 is also scaled to the same resolution as the corresponding region of the reference aerial image 2 (step 22, FIG. 3). This creates a 1-1 relationship between the pixels in the acquired aerial image 1 and the corresponding pixels in the reference aerial image 2.

Once the acquired aerial image 1 has been warped and scaled to the reference aerial image 2, the mutual information $$\left(I(X;Y) = \int\int_{Y,X} p(x,y)\log\left(\frac{p(x,y)}{p(x)p(y)}\right)dxdy\right)$$

for the image data in the acquired aerial image 1 and the image data in the reference aerial image 2 is calculated, for a patch 5 centred on each of the pixels 6 in the acquired aerial image 1 and the corresponding patch (centred on the corresponding pixels) in the reference aerial image 2 (step 23, FIG. 3).

The mutual information calculated for each patch 5 is compared to a threshold (step 24, FIG. 3). When the mutual information is greater than the threshold, this indicates that there is a good correlation between the image data in the acquired and reference aerial images 1, 2, indicating that it is likely that this patch 5 of the acquired aerial image 1 is free from cloud. When the mutual information is less than the threshold, this indicates that there is a poor correlation between the image data in the acquired and reference aerial images 1, 2, indicating that it is likely that this patch 5 of the acquired aerial image 1 is covered by cloud.

Comparing the calculated mutual information to the threshold for each of the patches 5 of the acquired aerial image 1 enables the number of patches 5 of the acquired aerial image 1 to be determined, simply by summing the number of patches 5 for which the mutual information is less than the threshold (step 25, FIG. 3). This then enables the proportion of the acquired aerial image 1 which is covered by cloud to be determined, by calculating the ratio of the number of patches 5 determined to contain cloud to the total number of patches 5.

The proportion is stored (i.e. written back to the memory 13) in the meta-data associated with the acquired aerial image 1, so that future users may use the proportion as a search key when filtering acquired aerial images 1 in future (e.g. they may only be interested in viewing acquired aerial images 1 that have less than a certain proportion of their area covered in cloud). When the proportion is very high, e.g. over 90%, the acquired aerial image 1 may simply be discarded, owing to it being of little value for future analysis of this area of the earth's surface.

To aid the user analyse the acquired aerial image 1 when some of the image is covered in cloud, the features from the reference aerial image 2 (corresponding to the patches 5 of the acquired aerial image 1 that are covered in cloud) can be blended onto the acquired aerial image 1 (step 26, FIG. 3).

The invention claimed is:

1. A computer implemented method of detecting clouds in an acquired aerial image, the computer implemented method comprising:
   a first step of selecting a region within an acquired aerial image;
   a second step of determining a region within a reference aerial image corresponding to the selected region within the acquired aerial image, wherein the determined region within the reference aerial image corresponds to the same aerial extent as the selected region within the acquired aerial image;
   a third step of selecting a plurality of corresponding pairs of locations, wherein a first location in a pair is a location in the determined region within the reference aerial image and the second location in the pair is a location in the selected region within the acquired aerial image, wherein the first location and the second location correspond to the same aerial location on the determined region within the reference aerial image and the selected region within the acquired areal image;
   a fourth step of calculating, for the plurality of corresponding pairs of locations over the selected region within the acquired aerial image and the determined region within the reference aerial image, the mutual information of one or more variables associated with the plurality of corresponding pairs of locations over the selected region within the acquired aerial image and the determined region within the reference aerial image;
   wherein the mutual information comprises a statistical method of matching that determines the similarity between the selected region within the acquired aerial image and the determined region within the reference aerial image; and
   a fifth step of determining, using the mutual information calculated for the plurality of corresponding pairs of locations over the selected region within the acquired aerial image, when the selected region within the acquired aerial image displays a cloud in the selected region within the acquired aerial image.

2. The computer implemented method as claimed in claim 1, wherein the second step of the computer implemented method further comprises aligning the selected region within the acquired aerial image to the determined region within the reference aerial image.

3. The computer implemented method as claimed in claim 2, wherein the selected region within the acquired aerial image is aligned to the determined region within the reference aerial image using meta-data associated with the acquired aerial image and meta-data associated with the reference aerial image.

4. The computer implemented method as claimed in claim 1, wherein the second step of the computer implemented method further comprises warping the selected region within the acquired aerial image to the determined region within the reference aerial image.

5. The computer implemented method as claimed in claim 1, wherein the second step of the computer implemented method further comprises scaling the selected region within the acquired aerial image to the determined region within the reference aerial image.

6. The computer implemented method as claimed in claim 1, wherein the mutual information is calculated in the fourth step of the computer implemented method using one or more image data variables associated with the plurality of corresponding pairs of locations in the selected region within the acquired aerial image and the determined region within the reference aerial image.

7. The computer implemented method as claimed in claim 6, wherein the acquired aerial image comprises a grayscale image, the reference aerial image comprises a colour image, and wherein the mutual information is calculated using the grayscale luminance data from the selected region within the acquired aerial image and luminance of the colour image data from the reference aerial image.

8. The computer implemented method as claimed in claim 1, wherein the mutual information is calculated using the one or more variables over a patch encompassing the corresponding pairs of locations over the selected region within the acquired aerial image and the determined region within the reference aerial image.

9. The computer implemented method as claimed in claim 1, wherein the fifth step of the computer implemented method comprises determining when the selected region within the acquired aerial image displays a cloud at the first location in the selected region within the acquired aerial image comprises applying a threshold to the mutual information, and when calculated mutual information at the corresponding pair of locations is greater than the threshold, determining that the acquired aerial image is displaying a cloud at the first location.

10. The computer implemented method as claimed in claim 1, wherein the fifth step of the computer implemented method further comprises determining, using the determination of when the selected region within the acquired aerial image displays a cloud at the plurality of first locations in the selected region within the acquired aerial image, the proportion of the region within the acquired aerial image at which cloud is displayed.

11. The computer implemented method as claimed in claim 10, further comprising storing the proportion of the region within the acquired aerial image at which cloud is displayed in meta-data associated with the acquired aerial image.

12. The computer implemented method as claimed in claim 1, wherein the method further comprises; for the plurality of first locations over the selected region within the acquired aerial image at which it has been determined that the acquired aerial image displays a cloud; and superimposing at least some of the image data from the corresponding second location in the determined region within the reference aerial image onto the acquired aerial image at the first location in the acquired aerial image.

13. A non-transitory computer readable storage medium storing computer software code which when executing on a data processing system performs a computer implemented method as claimed in claim 1.

14. A data processing system detecting clouds in an acquired aerial image, the data processing system comprising:
   processing circuitry configured to:
   in a first step, select a region within an acquired aerial image;
   in a second step, determine a region within a reference aerial image corresponding to the selected region within the acquired aerial image, wherein the determined region within the reference aerial image has an aerial extent that is less than the aerial extent of the selected region within the acquired aerial image;
   in a third step, select a plurality of corresponding pairs of locations, wherein a first location in a pair is a location in the determined region within the reference aerial image and the second location in the pair is a location in the selected region within the acquired aerial image, wherein the first location and the second location correspond to the same aerial location on the determined region within the reference aerial image and the selected region on the acquired areal image;
   in a fourth step, calculate, for the plurality of corresponding pairs of locations over the selected region within the acquired aerial image and the determined region within the reference aerial image, the mutual information of one or more variables associated with the plurality of corresponding pairs of locations over the selected region within the acquired aerial image and the determined region within the reference aerial image;
   wherein the mutual information is a statistical method of matching that determines the similarities between the plurality of corresponding pairs of locations; and
   in a fifth step, determine, using the mutual information calculated for each of the plurality of locations over the selected region within the acquired aerial image, when the selected region within the acquired aerial image displays a cloud in the selected region within the acquired aerial image.

\* \* \* \* \*